(12) United States Patent
Guizilini et al.

(10) Patent No.: US 12,159,423 B2
(45) Date of Patent: Dec. 3, 2024

(54) MULTI-CAMERA COST VOLUMES FOR SELF-SUPERVISED DEPTH ESTIMATION

(71) Applicant: Toyota Research Institute, Inc., Los Altos, CA (US)

(72) Inventors: Vitor Guizilini, Santa Clara, CA (US); Jie Li, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 393 days.

(21) Appl. No.: 17/696,341

(22) Filed: Mar. 16, 2022

(65) Prior Publication Data
US 2023/0298191 A1 Sep. 21, 2023

(51) Int. Cl.
*G06T 7/55* (2017.01)
*G06F 18/214* (2023.01)
*G06T 5/50* (2006.01)
*G06T 7/00* (2017.01)

(52) U.S. Cl.
CPC .............. *G06T 7/55* (2017.01); *G06F 18/214* (2023.01); *G06T 5/50* (2013.01); *G06T 7/97* (2017.01)

(58) Field of Classification Search
CPC .... G06T 7/55; G06T 5/50; G06T 7/97; G06T 2207/20081; G06T 7/85; G06T 7/593; G06F 18/214
USPC ........................................................ 382/154
See application file for complete search history.

(56) References Cited

U.S. PATENT DOCUMENTS

| | | | |
|---|---|---|---|
| 10,453,249 B2 | 10/2019 | Smirnov et al. | |
| 10,482,618 B2 | 11/2019 | Jain et al. | |
| 10,950,037 B2 | 3/2021 | Sunkavalli et al. | |
| 11,100,664 B2 | 8/2021 | Wantland et al. | |
| 11,120,567 B2* | 9/2021 | Lee | H04N 23/698 |
| 2022/0011778 A1* | 1/2022 | Chidlovskii | G06T 7/136 |
| 2022/0084229 A1* | 3/2022 | Guizilini | G06T 3/18 |

FOREIGN PATENT DOCUMENTS

| | | | |
|---|---|---|---|
| CN | 111462329 A | | 7/2020 |
| CN | 113436269 | * | 9/2021 |
| JP | 2021002783 A | | 1/2021 |
| JP | 2022024688 | * | 2/2022 |

(Continued)

OTHER PUBLICATIONS

Full Surround Monodepth from Multiple Cameras, Vitor Guizilini, et al., Jan. 1, 2020., https://arxiv.org/abs/2104.00152.

*Primary Examiner* — Jerome Grant, II
(74) *Attorney, Agent, or Firm* — DINSMORE & SHOHL LLP

(57) ABSTRACT

A method may include receiving a first image of a scene captured by a first camera at a first time step and plurality of other images of the scene captured by a plurality of other cameras at a plurality of time steps, determining a geometric relationship between the first camera at the first time step and each of the other cameras at the plurality of time steps, determining a cost volume for the first image captured by the first camera at the first time step based on the first image, the plurality of other images, and the geometric relationship between the first camera at the first time step and each of the other cameras at the plurality of time steps, and determining a depth map for the first image based on the cost volume, the depth map comprises a depth value of each pixel of the first image.

17 Claims, 5 Drawing Sheets

(56) References Cited

FOREIGN PATENT DOCUMENTS

| KR | 102110690 B1 | 5/2020 | | |
|----|--------------|--------|---|---|
| WO | 2021076185 A | 4/2021 | | |
| WO | 2021084530 A | 5/2021 | | |
| WO | WO2021135676 | * | 7/2021 | ............... G06T 3/00 |

* cited by examiner

MULTI-CAMERA COST VOLUMES FOR SELF-SUPERVISED DEPTH ESTIMATION

TECHNICAL FIELD

The present specification relates to creating a depth map for an image and more particularly to multi-camera cost volumes for self-supervised depth estimation.

BACKGROUND

Depth estimation techniques may be used to obtain a representation of the spatial structure of a scene. In particular, depth estimation techniques may be used to obtain a depth map of a two-dimensional (2D) image of a scene comprising a measure of a distance of each pixel in the image from the camera that captured the image. While humans may be able to look at a 2D image and estimate depth of different features in the image, this can be a difficult task for a machine. However, depth estimation can be an important task for applications that rely on computer vision, such as autonomous vehicles.

In some applications, depth values of an image may be estimated using supervised learning techniques. However, supervised learning techniques typically require a large amount of data and ground truth values for training, which may not be readily available. Accordingly, a need exists for improved depth estimation techniques using self-supervision.

SUMMARY

In one embodiment, a method may include receiving a first image of a scene captured by a first camera at a first time step and plurality of other images of the scene captured by a plurality of other cameras at a plurality of time steps, determining a geometric relationship between the first camera at the first time step and each of the other cameras at each of the plurality of time steps, determining a cost volume for the first image captured by the first camera at the first time step based on the first image, the plurality of other images, and the geometric relationship between the first camera at the first time step and each of the other cameras at each of the plurality of time steps, and determining a depth map for the first image based on the cost volume, the depth map comprises a depth value of each pixel of the first image.

In another embodiment, a remote computing device may include a controller programmed to receive a first image of a scene captured by a first camera at a first time step and a plurality of other images of the scene captured by a plurality of other cameras at a plurality of time steps, determine a geometric relationship between the first camera at the first time step and each of the other cameras at each of the plurality of time steps, determine a cost volume for the first image captured by the first camera at the first time step based on the first image, the plurality of other images, and the geometric relationship between the first camera at the first time step and each of the other cameras at each of the plurality of time steps, and determine a depth map for the first image based on the cost volume, the depth map comprises a depth value of each pixel of the first image.

In another embodiment, a system may include a plurality of cameras and a remote computing device. The remote computing device may include a controller programmed to receive a first image of a scene captured by a first camera at a first time step and a plurality of other images of the scene captured by the plurality of cameras at a plurality of time steps, determine a geometric relationship between the first camera at the first time step and each of the other cameras at each of the plurality of time steps, determine a cost volume for the first image captured by the first camera at the first time step based on the first image, the plurality of other images, and the geometric relationship between the first camera at the first time step and each of the other cameras at each of the plurality of time steps, and determine a depth map for the first image based on the cost volume, the depth map comprises a depth value of each pixel of the first image.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structure is indicated with like reference numerals and in which.

DETAILED DESCRIPTION

Figure 1:
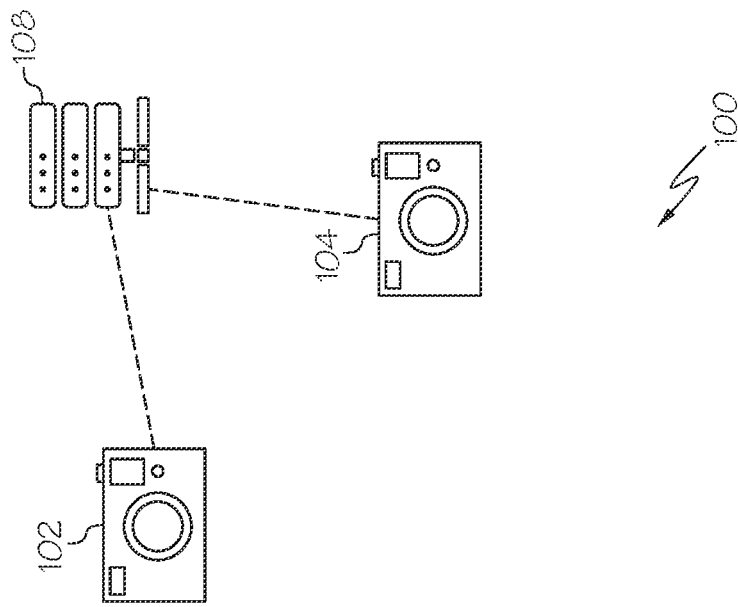
FIG. 1 schematically depicts a system for estimating a depth map for a captured image, according to one or more embodiments shown and described herein.
Figure 1:
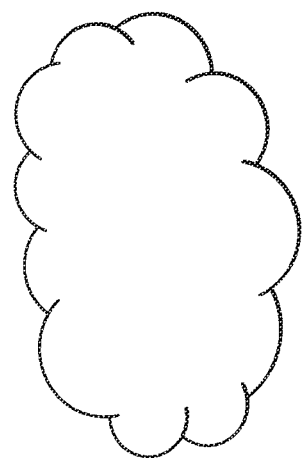
Figure 1:
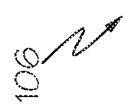

The embodiments disclosed herein include a method and system for estimating depth values of each pixel in a 2D image captured by a camera or other image capture device. That is, for a given image captured by a camera, embodiments disclosed herein may estimate a distance from the camera to each pixel of the image, using the techniques disclosed herein. In particular, embodiments disclosed herein may estimate depth values using self-supervision. That is, depth values may be estimated without training a system using actual ground truth depth values.

In embodiments disclosed herein, multiple images of a scene may be captured by a plurality of cameras at the same time, or at different times. It is assumed that the geometry of the cameras (e.g., location and orientation of the plurality of cameras with respect to each other) is known. As such, if two cameras each capture an image of a scene from two different perspectives, a given pixel in the image captured by the first camera will correspond to a particular pixel in the image captured by the second camera, since the same scene is imaged by both cameras. However, the specific correspondence between pixels of the first image and pixels of the second image may vary depending on the depth of each pixel. For example, if a depth value of a pixel A in the image of the scene captured by the first camera is 20 meters, it may correspond to a particular pixel B in the image of the scene captured by the second camera. However, if the depth of the pixel A in the image of the scene captured by the first camera is 40 meters, it may correspond to a different pixel C in the image of the scene captured by the second camera.

As such, a depth estimation system may consider a plurality of potential depth values for each pixel in the image captured by the first camera. That is, the depth estimation system may assume a range of possible depth values for pixels in an image (e.g., 1 meter-100 meters) as potential depth values. The range of potential depth values may be set by a user of the depth estimation system. For each potential depth value for a given pixel in the image captured by the first camera, the system may determine a corresponding pixel in the image captured by the second camera, based on the known geometry between the two cameras. The system may then determine, for each potential depth value of a pixel in the image captured by the first camera, a data matching cost between the pixel in the image captured by the first camera and a determined corresponding pixel in the image captured by the second value (e.g., a difference in RGB values or feature values extracted from the images between the pixel in the image captured by the first camera and the corresponding pixel in the image captured by the second camera. Whichever potential depth value has the lowest data matching cost (e.g., the highest similarity) may be estimated to be the actual depth of the pixel.

A data matching cost may be determined as described above for each pixel of a 2D image at each potential depth value. As such, the depth estimation system may determine a cost volume associated with an image (e.g., the image of the scene captured by the first camera). In particular, the image may be divided into a plurality of voxels, in which each voxels has an x-coordinate of the image, a y-coordinate of the image, and a potential depth value. The data matching cost of each voxel may be determined as described above. Thus, the cost volume may comprise a set of data matching costs for each voxel of the image. After a cost volume is determined for an image, the actual depth for each pixel of the image may be estimated to be the potential depth value having the lowest data matching cost (e.g., the potential depth value that best matches the pixel from the two images).

If the scene is captured by more than two cameras, then for each potential depth value of the image of the scene captured by the first camera, each pixel in the image may be compared to a corresponding pixel in each of the other cameras. The system may then determine an estimated depth based on the potential depth value with the lowest data matching cost, or best matching, across all of the images captured by the other cameras. Similarly, if a single camera moves through an environment and captures images of the scene at multiple time steps from different perspectives, a cost volume may be determined for a first image of the scene captured at a first time step by determining a cost of matching the pixels of the first image to pixels of one or more images captured at other time steps, based on the relative geometry of the camera at each time step, based on the motion of the camera. In addition, if multiple cameras moves through an environment and capture images of the scene at multiple time steps, a cost volume may be determined for one of the images based on the known geometry between the cameras and the known motion of the cameras.

Turning now to the figures, FIG. 1 schematically depicts a system for performing self-supervised depth estimation. In the example of FIG. 1, a system 100 includes a first camera 102 and a second camera 104 that capture images of a scene 106. The first camera 102 and the second camera 104 may be positioned to capture images of the scene 106 from different perspectives. That is the cameras 102, 104 may be positioned at different locations and may have different orientations with respect to the scene 106. As such, the cameras 102, 104 may each capture a different view of the scene 106. By knowing the relationship between the first camera 102 and the second camera 104, a depth map of an image (e.g., an RGB-D image) captured by either of the cameras 102, 104 may be estimated using the techniques disclosed herein.

In the example of FIG. 1, two cameras are shown. However, in other examples, more than two cameras may be present that may each capture a different view of the scene 106. In some examples, one or both of the cameras 102, 104 may move and may capture an image of the scene 106 at two or more time steps. In these examples, the position and orientation of each moving camera may be known at each time step. In one example, a user may manually enter the position and orientation of each camera at each time step. In other examples, each camera may have one or more sensors (e.g., a GPS sensor) that may automatically record its position and orientation when an image is captured.

In the example of FIG. 1, a server 108 may be communicatively coupled to each of the cameras 102, 104. In particular, the server 108 may receive images captured by the cameras 102, 104, as disclosed in further detail below. In some examples, the server 108 may be a remote computing device located remotely from the cameras 102, 104. In some examples, the server 108 may be a cloud computing device. In other examples, the server 108 may be a computing device located near the cameras 102, 104 and/or the scene 106.

In embodiments, the cameras 102, 104 may capture images of the scene 106 from their respective perspectives, based on the locations and orientations of the cameras 102, 104. After either of the cameras 102, 104 captures an image of the scene 106, the captured image may be transmitted to the server 108. In some examples, the cameras 102, 104 may also transmit their location and orientation with respect to the scene 106 to the server 108 (e.g., based on GPS or other data). In examples where one or both of the cameras 102, 104 are moving, the cameras 102, 104 may transmit their location and orientation with respect to the scene 106 as each image of the scene 106 is captured. After receiving captured images from the cameras 102, 104, the server 108 may determine a depth map of a captured image of the scene 106, as explained in further detail below.

Figure 2:
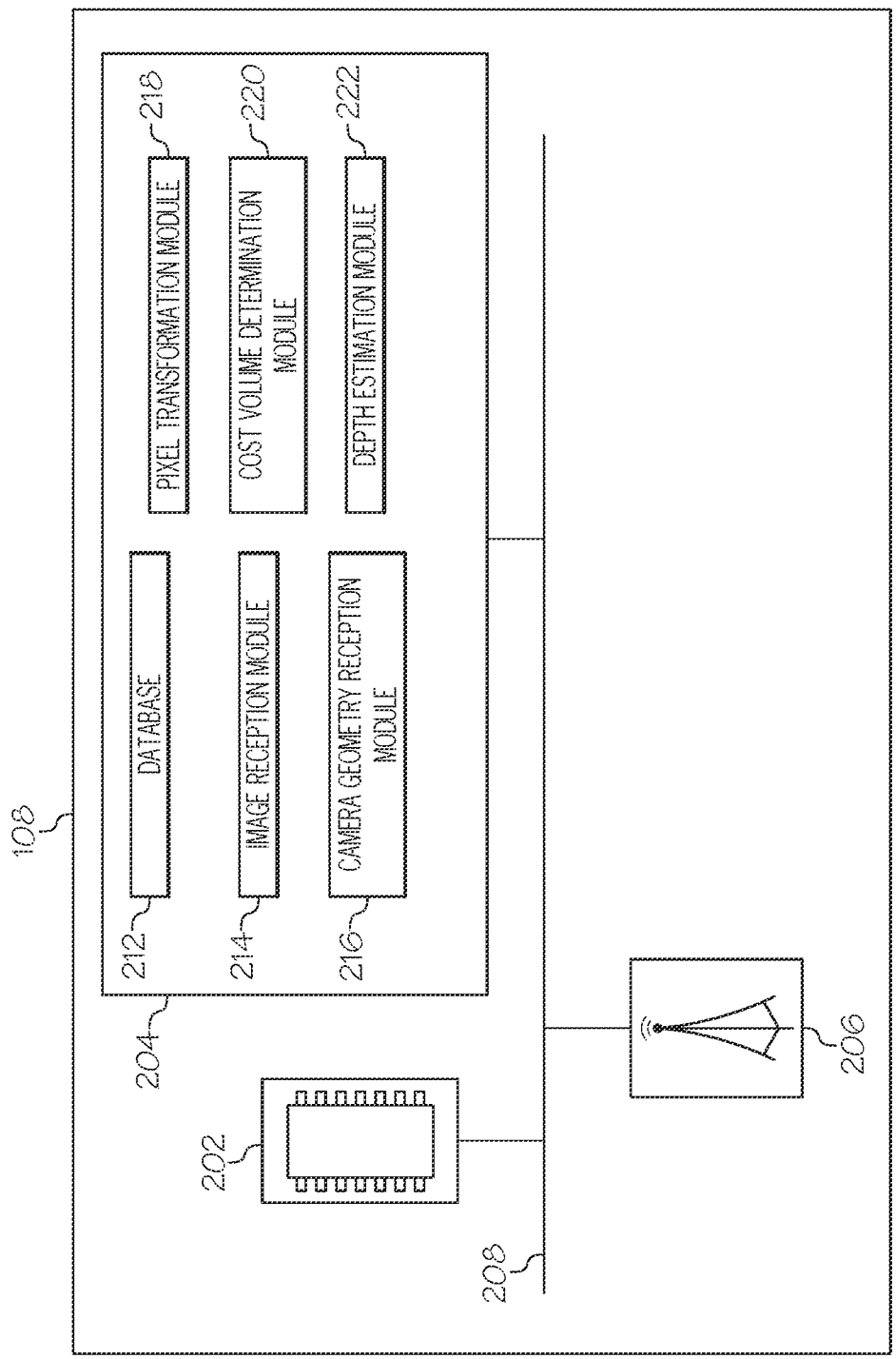
FIG. 2 depicts a schematic diagram of the server of FIG. 1, according to one or more embodiments shown and described herein.

Now referring to FIG. 2, the server 108 comprises one or more processors 202, one or more memory modules 204, network interface hardware 206, and a communication path 208. The one or more processors 202 may be a controller, an integrated circuit, a microchip, a computer, or any other computing device. The one or more memory modules 204 may comprise RAM, ROM, flash memories, hard drives, or any device capable of storing machine readable and executable instructions such that the machine readable and executable instructions can be accessed by the one or more processors 202.

The network interface hardware 206 can be communicatively coupled to the communication path 208 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. In some examples, the network interface hardware 206 may include two different channels including a Dedicated Short-Range Communication (DSRC) channel and a millimeter wave radio channel, as discussed in further detail below. The network interface hardware 206 of the server 108 may transmit and receive data to and from one or more cameras (e.g., the cameras 102, 104 of FIG. 1).

The one or more memory modules 204 include a database 212, an image reception module 214, a camera geometry reception module 216, a pixel transformation module 218, a cost volume determination module 220, and a depth estimation module 222. Each of the database 212, the image reception module 214, the camera geometry reception module 216, the pixel transformation module 218, the cost volume determination module 220, and the depth estimation module 222 may be a program module in the form of operating systems, application program modules, and other program modules stored in the one or more memory modules 204. In some embodiments, the program module may be stored in a remote storage device that may communicate with the server 108. Such a program module may include, but is not limited to, routines, subroutines, programs, objects, components, data structures and the like for performing specific tasks or executing specific data types as will be described below.

The database 212 may store data received from the cameras 102, 104. This data may include images captured by the cameras 102, 104, as well as camera geometry (e.g., positions and orientations of the cameras 102, 104 with respect to the scene 106). In some examples, the camera geometry of the cameras 102, 104 may be stored in the database 212 without being received directly from the cameras 102, 104. For example, a user may input camera geometries for the cameras 102, 104, and any other cameras that may be part of the system 100, which may be stored in the database 212. The database 212 may also store other data used by the memory modules 204.

The image reception module 214 may receive images of the scene 106 captured by the cameras 102, 104. An image captured by either of the cameras 102, 104 may comprise a two-dimensional (2D) image of the scene 106 from the perspective of the particular camera. A captured image may comprise a plurality of pixels, wherein the number of pixels depends on the parameters of the camera capturing the image. In embodiments, the captured images may be color images and each pixel of a captured image may have an RGB value. However, in other examples, the captured images may be grayscale images or other types of images, and each pixel of a captured image may have a value based on the type of the captured image.

Because a captured image is a 2D image, the pixels of a captured image do not include depth values for the pixels. As such, the system 100 may be utilized to create a depth map for each captured image, using the techniques disclosed herein. In particular, by capturing multiple images of a scene from different perspectives (e.g., a first perspective of the first camera 102 and a second perspective of the second camera 104), depth values of a captured image may be estimated as described in further detail below.

The camera geometry reception module 216 may receive camera geometry of the cameras 102, 104. In particular, the camera geometry reception module 216 may receive camera geometry comprising a position of each of the cameras 102, 104, and an orientation of each the cameras 102, 104 with respect to the scene 106. For example, an orientation of the cameras 102, 104 may comprise an angle of a lens of the cameras 102, 104 with respect to the scene 106. In some examples, a geometric relationship between the cameras 102, 104 may be determined by determining a relative position and angle of rotation of the cameras 104 with respect to the first camera 102.

In some examples, the camera geometry reception module 216 may receive camera geometry directly from the cameras 102, 104. In these examples, the cameras 102, 104 may determine their location and orientation based on data received by a GPS device or other sensor. In other examples, the camera geometry reception module 216 may receive camera geometry from other sources. For example, a user may transmit camera geometry to the server 108, which may be received by the camera geometry reception module 216. In some examples, the database 212 may store camera geometry information for a plurality of cameras. In these examples, when an image is received from a particular camera, the camera geometry reception module 216 may access the database 212 to retrieve the camera geometry for that particular camera.

In examples where one or both of the cameras 102, 104 are moving, the cameras may capture images at multiple time steps. At each time step, the camera geometry may be different (e.g., a camera may capture multiple images at several locations and/or rotate as it moves). In these examples, as a camera moves and/or rotates, each time that an image is captured by the camera, the camera may transmit the captured image along with the camera geometry at the time step when the image is captured to the server 108. Each captured image may be received by the image reception module 214, and the camera geometry associated with each captured image may be received by the camera geometry reception module 216. The server 108 may store each received image along with the associated camera geometry in the database 212.

The pixel transformation module 218 may transform a pixel of an image captured by one camera to a pixel of an image captured by another camera, as disclosed herein. For example, the pixel transformation module 218 may transform a pixel of an image of the scene 106 captured by the first camera 102 to a pixel of an image of the scene 106 captured by the second camera 104. That is, the pixel transformation module 218 may determine which pixel of the image captured by the second camera 104 corresponds to each pixel of the image captured by the first camera 102.

Each pixel of an image captured by the first camera 102 may represent a particular physical point in the scene 106. Because the first camera 102 and the second camera 104 both capture an image of the same scene 106, an image captured by the second camera 104 may also include the same point in the scene 106. As such, each pixel of an image of the scene 106 captured by the first camera 102 may correspond to a particular pixel of an image of the scene 106 captured by the second camera 104. The particular transformation of pixels between images captured by the cameras 102 and 104 depends on the relative camera geometry between the two cameras 102, 104 and the depth of the pixel. Because the camera geometry of each of the cameras 102, 104 is known, the pixel depth can be determined as disclosed herein.

Figure 3:
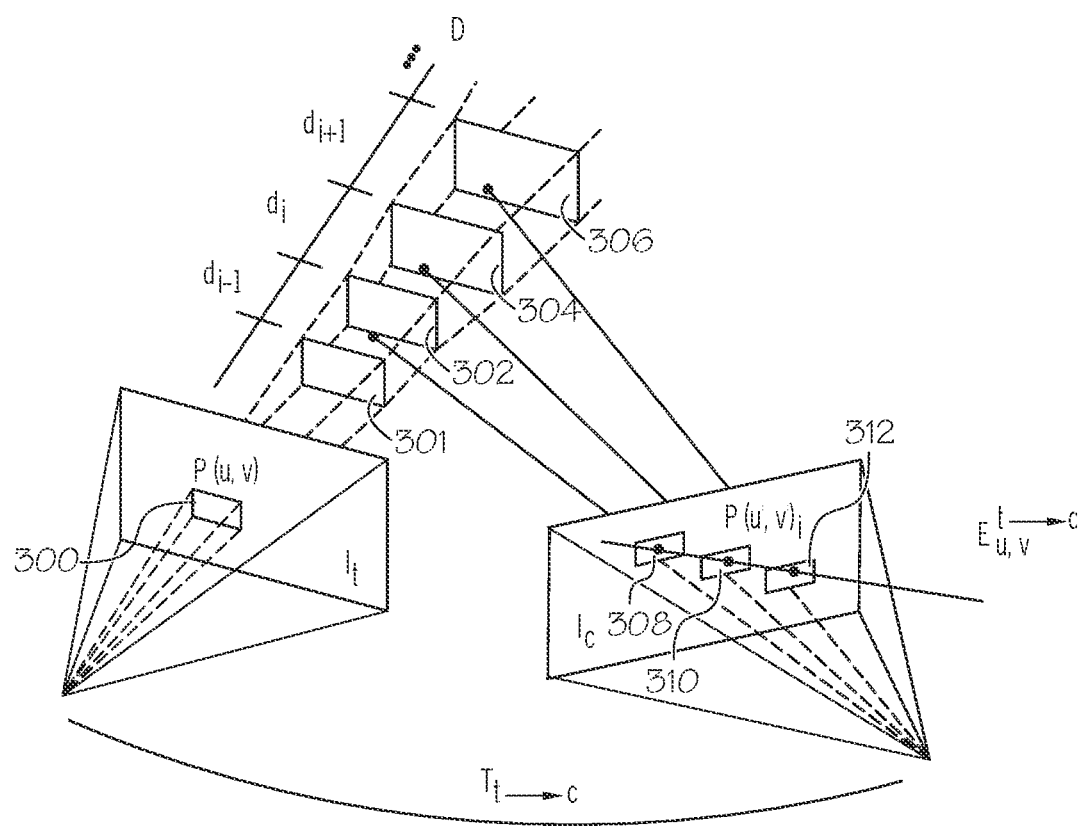
FIG. 3 illustrates determining pixel transformations, according to one or more embodiments shown and described herein.

FIG. 3 shows an example of two images of the scene 106 captured by the cameras 102, 104. The image It of FIG. 3 may be captured by the first camera 102 and the image Ic of FIG. 3 may be captured by the second camera 104. From just a single image (e.g., the image It), it may not be possible to determine what the depth values of the pixels in the image are. Accordingly, the server 108 may sample a plurality of potential depth values for a pixel and compare the pixel to a corresponding pixel in another image of the scene captured by another camera for each of the potential depth values, as disclosed herein.

In the example of FIG. 3, any particular pixel of the image It captured by the first camera 102 may have D potential depth values. For example, 100 potential depth values may be considered. In some examples, the potential depth values may be equally spaced (e.g., 1 m, 2 m, 3 m, . . . , 100 m). In other examples, the potential depth values may be spaced in any other manner (e.g, logarithmically). While 100 potential depth values is given for illustrative purposes, any number of potential depth values may be considered. In some examples, the potential depth values may be specified by a user.

For each potential depth value of a pixel in an image of the scene 106 captured by the first camera 102, the pixel transformation module 218 may determine a corresponding pixel in an image of the scene 106 captured by the second camera 104 based on the relative camera geometry between the cameras 102, 104. For example, FIG. 3 shows the images It and Ic captured by the first camera 102 and the second camera 104, respectively, as being taken from different perspectives.

In the image It captured by the first camera 102, a pixel 300 has coordinates (u,v) and an RGB value P(u,v). The point in the scene 106 captured by the pixel 300 has a certain depth value from the first camera 102. Furthermore, the point in the scene 106 captured by the pixel 300 may also be captured by the second camera 104 in a corresponding pixel in the image Ic. However, the coordinates of the pixel in the image Ic that corresponds to the pixel 300 will likely have different coordinates than (u,v) based on the different perspective of the images It and Ic. In the example of FIG. 3, the coordinates of the pixel in the image Ic that corresponds to the pixel in the image It is (u',v'). In particular, the coordinates (u',v') will line along a depth-discretized epipolar line $\in_{u,v}^{t \rightarrow c}$, where t→c represents a transformation of a pixel from the image It to the image Ic.

In the example of FIG. 3, the pixel 300 in image It is shown as having four potential depths represented as 301, 302, 304, and 306. In the example of FIG. 3, only four potential depth values are shown for purposes of illustration. However, it should be understood that in other examples, any number of potential depth values may be used.

In the example of FIG. 3, if the pixel 300 in image It has depth 302, then the corresponding pixel in image Ic is pixel 308. If the pixel 300 in image It has depth 304, then the corresponding pixel in image Ic is pixel 310. If the pixel 300 in image It has depth 306, then the corresponding pixel in image Ic is pixel 312. In particular, the relationship between the coordinates (u,v) of a pixel in the image It captured by the first camera 102 and the coordinates (u',v') of a pixel in the image Ic captured by the second camera 104 depends on the geometric relationship between the cameras 102, 104 and the potential depth value for each pixel. Accordingly, for any given pixel having particular coordinates in the image It of the scene 106 captured by the first camera 102, the pixel transformation module 218 may determine the coordinates of the corresponding pixel in the image Ic of the scene 106 captured by the second camera 104. This information may then be used to determine a cost volume, as discussed in further detail below.

Referring back to FIG. 2, the cost volume determination module 220 may determine a cost volume for an image. For example, the cost volume determination module 220 may determine a cost volume for an image of the scene 106 captured by the first camera 102 based on an image of the scene 106 captured by the second camera 104, as disclosed herein. A cost volume may comprise a data matching cost, for each voxel of a first image of a scene, between pixels of the first image compared to pixels of another image of the same scene, wherein each voxel comprises a 2D image coordinate and a potential depth value. As discussed above, the cameras 102, 104 each capture a 2D image of the scene 106. As such, each pixel of an image captured by the first camera 102 has a 2D coordinate (e.g., an x-coordinate and a y-coordinate). In the example of FIG. 3, the pixel 300 in the image It has coordinates (u, v).

In addition to a 2D coordinate, each pixel may also have one or more potential depth values, as discussed above. In the example of FIG. 3, each pixel has D potential depth values. The potential depth values of each pixel can be represented as a third coordinate. Thus, an image captured by the first camera 102 may be represented as a plurality of voxels in three-dimensional (3D) space, in which each voxel has an x-coordinate, a y-coordinate, and a potential depth value.

With an image captured by the first camera 102 represented by voxels, the cost volume determination module 220 may determine a data matching cost for each voxel, as disclosed herein. In particular, for each voxel of an image captured by the first camera 102, the pixel transformation module 218 may determine the coordinates of the corresponding pixel in an image captured by the second camera 104 based on the x and y-coordinates of the voxel, the potential depth value of the voxel, and the geometric relationship between the first camera 102 and the second camera 104, as described above.

After determining the corresponding pixel in the image captured by the second camera 104, the cost volume determination module 220 may determine a data matching cost between the voxel in the image captured by the first camera 102, and the corresponding pixel in the image captured by the second camera 104. In one example, the data matching cost may comprise a difference between the RGB value of the voxel in the image captured by the first camera 102 and the RGB value of the corresponding pixel in the image captured by the second camera 104. In other examples, the data matching cost may be determined at a feature level. That is, the server 108 may determine feature values for each pixel of a captured image based on the raw image data using any technique for extracting features. The cost volume determination module 220 may then determine a data matching cost comprising a difference between feature values of a voxel in the image captured by the first camera 102 and the feature values of the corresponding pixel in the image captured by the second camera 104.

In some examples, instead of determining a data matching cost, the cost volume determination module 220 may determine a similarity metric. A similarity metric may be based on a difference in RGB values or feature values between corresponding pixels of different images, in a similar manner as a data matching cost. However, for a data matching cost, a lower value equates to a greater similarity between the pixels, where for a similarity metric, a higher value equates to a greater similarity between the pixels.

In embodiments, the cost volume determination module 220 may determine a data matching cost for each voxel of an image captured by the first camera 102, as described above. As such, the plurality of data matching costs of all of the voxels comprises a cost volume for the image. The cost volume may then be used to determine a depth estimate for each pixel of the image, as discussed in further detail below.

In the example discussed above, images of the scene 106 were captured by two cameras 102, 104. As such, the cost volume determination module 220 determines a cost volume for an image captured by the first camera 102 by determining a data matching cost of matching each voxel of the captured image to the corresponding pixel in an image captured by the second camera 104. However, in some examples, there may be more than two cameras that capture images of the scene 106. In these examples, a cost volume may be determined as discussed below.

Figure 4:
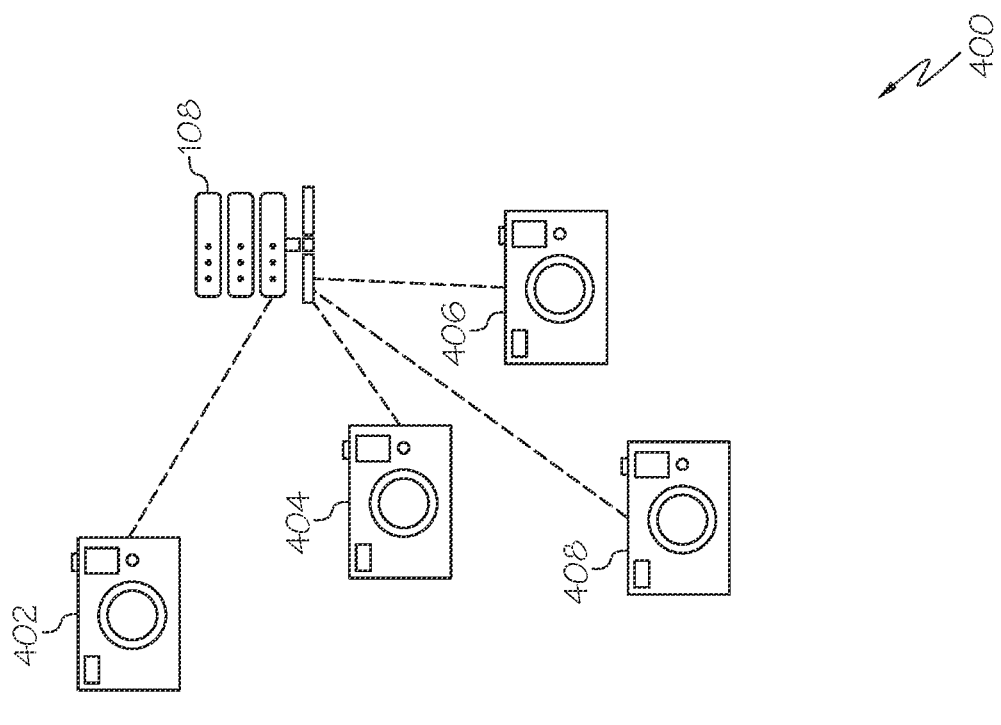
FIG. 4 schematically depicts another system for estimating a depth map for a captured image, according to one or more embodiments shown and described herein.

If more than two cameras capture images of the scene 106, the cost volume determination module 220 may determine a cost volume for an image captured by one of the cameras by determining a data matching cost based on the images captured by each of the other cameras, as disclosed herein. For example, FIG. 4 shows a system 400, similar to the system 100, except that the system 400 includes cameras 402, 404, 406, 408. In the example of FIG. 4, the cameras 402, 404, 406, and 408 each capture images of the scene 106 from different perspectives and the cost volume determination module 220 may determine a cost volume of the image captured by the first camera 402, as described below.

Similar to the example discussed above with respect to the system 100 of FIG. 1, an image of the scene 106 captured by the first camera 402 may be described by a plurality of voxels, wherein each voxel has an x-coordinate, a y-coordinate, and a potential depth value. For each voxel of the image, the pixel transformation module 218 may determine a corresponding pixel in each image of the scene 106 captured by each of the other cameras 404, 406, and 408 that corresponds to the pixel of the image captured by the first camera 402 and the potential depth value of the voxel. In other words, a corresponding pixel in each image of the scene 106 captured by each of the other cameras 404, 406, and 408 is associated with the plurality of voxels defined for the image of the scene 106 captured by the first camera 402. In particular, the camera geometry of each of the cameras 404, 406, 408 with respect to the camera 402 may be known, and the pixel transformation module 218 may determine the corresponding pixel in each image captured by each of the cameras 404, 406, 408 based on the known camera geometry.

The cost volume determination module 220 may then determine a data matching cost between a voxel of the image captured by the camera 402 and the corresponding pixel, as determined by the pixel transformation module 218, of each of the images captured by each of the other cameras 404, 406, 408. That is, for a given voxel in the image captured by the camera 402, the cost volume determination module 220 may determine a first data matching cost between the voxel and the corresponding pixel in the image captured by the camera 404, a second data matching cost between the voxel and the corresponding pixel in the image captured by the camera 406, and a third data matching cost between the voxel and the corresponding pixel in the image captured by the camera 408. As discussed above, the data matching cost may be based on a difference in RGB values or a difference in feature values.

After the cost volume determination module 220 determines the data matching cost between a voxel in the image captured by the camera 402 and the corresponding pixel in the images captured by each of the cameras 404, 406, 408, the cost volume determination module 220 may determine an overall data matching cost for the voxel. In one example, the cost volume determination module 220 may determine the overall data matching cost by averaging the data matching costs between the voxel from the image captured by the camera 402 and each of the corresponding pixels from the images captured by the cameras 404, 406, 408. In another example, the cost volume determination module 220 may determine the overall data matching cost by taking the minimum data matching cost from among the data matching costs between the voxel from the image captured by the camera 402 and each of the corresponding pixels from the images captured by the cameras 404, 406, 408.

By averaging the data matching costs for a given voxel, the overall data matching cost may include data from each of the other cameras that capture an image of the scene 106. However, if there are occlusions of certain pixels from one of the cameras, the data from the camera having the occlusion may skew the average. As such, taking the minimum data matching cost may avoid this problem by assuming that the camera having the best data matching is the most accurate, and ignoring the data from the other cameras for the particular voxel. In other examples, the data matching costs between the voxel from the image captured by the camera 402 and the corresponding pixels of the images captured by each of the cameras 404, 406, ad 408 may be combined in other manners to determine an overall data matching cost.

After determining the overall data matching cost for a particular voxel, using any of the techniques described above, the cost volume determination module 220 may assign the determined overall data matching cost to be the cost volume for the particular voxel. The cost volume determination module 220 may similarly determine the data matching cost for each other voxel of the image captured by the camera 402. As such, the cost volume determination module 220 may determine the cost volume for the entire image captured by the camera 402.

In examples where one of more cameras capture images while moving, the cost volume determination module 220 may similarly determine the cost volume for a given image captured by a camera at a particular time step. In these examples, the camera geometry of each camera at each time step may be known (e.g., based on the movement of the cameras). As such, for an image captured by a particular camera at a particular time step, the pixel transformation module 218 may determine corresponding pixels for each image captured by the particular camera or by other cameras at particular time steps. The cost volume determination module 220 may then combine the data matching cost determined for each voxel to determine the cost volume for the image, as discussed above.

If one or more of the cameras are moving, it may be more likely that an occlusion of one or more pixels occurs in one or more of the cameras. However, as discussed above, the effect of such occlusions can be minimized by either averaging the data matching costs for each voxel from a plurality of images together, or by taking the minimum data matching cost for each voxel, which by definition, will ensure the best match.

Referring back to FIG. 2, the depth estimation module 222 may determine a depth estimate for each pixel of an image based on the cost volume for the image determined by the cost volume determination module 220. As discussed above, the cost volume determined by the cost volume determination module 220 may indicate a data matching cost for each voxel of a captured image. That is, for each pixel of the captured image, the cost volume may indicate a data matching cost for each potential depth value. The potential depth value having the lowest data matching cost is the most likely depth value for a given pixel. Thus, for each pixel of the captured image, the depth estimation module 222 may select the potential depth value having the lowest data matching cost as the estimated depth for that pixel. As such, the depth estimation module 222 may determine a depth map for the captured image, comprising an estimated depth for each pixel of the captured image.

Figure 5:
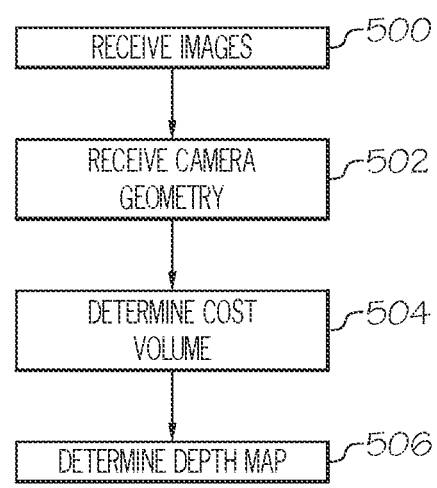
FIG. 5 depicts a flowchart of a method of operating the system of FIGS. 1, 2 and 4, according to one or more embodiments shown and described herein.

FIG. 5 depicts a flowchart of an example method for operating the server 108 of FIGS. 1 and 2. At step 500, the image reception module 214 receives images of the scene 106 captured by the cameras 102 and 104. The images of the scene 106 may be captured by the cameras 102, 104 at a plurality of time steps.

At step 502, the camera geometry reception module 216 receives camera geometry from the cameras 102, 104. In particular, the camera geometry may indicate a position and orientation of the cameras 102, 104 with respect to the scene 106 when each of the images was captured. In some examples the camera geometry of each of the cameras 102, 104 may be automatically captured by sensors on the respective cameras 102, 104 (e.g., by a GPS or other type of sensor). In some examples, the camera geometry reception module 216 may also receive a time stamp indicating when a respective image was captured.

At step 504, the cost volume determination module 220 determines a cost volume for an image captured by the first camera 102. In particular, the cost volume determination module 220 may determine a plurality of voxels associated with the image, wherein each voxel comprises an RGB value of the image and one of a plurality of potential depth values. The plurality of potential depth values may be specified by a user and may be within a range of possible or likely depth values for pixels in the image. That is, each potential depth value may represent a 'guess' as to what the depth value for a pixel may be. The best guess for each pixel may be determined to be the actual estimated depth, as disclosed herein.

For each voxel of the image captured by the first camera 102, the pixel transformation module 218 may determine a corresponding pixel in the image captured by the second camera 104 based on the potential depth value of the voxel and the relative camera geometry between the cameras 102 and 104. For example, there may be 100 potential depth values of each pixel, d1, d2, d3, . . . , d100. Thus, a pixel P1 of the image captured by the first camera 102, with coordinates (x1, y1) will have 100 potential depth values. Thus, 100 voxels will be associated with pixel P1.

A first voxel represented by coordinates and depth value (x1, y1, d1) may correspond to a certain pixel in the image captured by the second camera 104 based on the relative camera geometry between the cameras 102, 104 and the depth value d1. A second voxel represented by coordinates and depth value (x1, y1, d2) may correspond to a different pixel in the image captured by the second camera 104 based on the relative camera geometry between the cameras 102, 104 and the depth value d2. As such, the pixel transformation module 218 may determine a pixel from the image captured by the second camera 104 corresponding to each voxel associated with pixel P1 in the image captured by the first camera 102.

Similarly, a pixel P2 of the image captured by the first camera 102, with coordinates (x2, y1) will have the same 100 potential depth values. Thus, the pixel transformation module 218 may determine a pixel from the image captured by the second camera 104 that corresponds to each voxel associated with pixel P2 in the image captured by the first camera 102. The pixel transformation module 218 may similarly determine the pixel in the image captured by the second camera 104 that corresponds to each voxel of the image captured by the first camera 102.

The cost volume determination module 220 may then determine a data matching cost between each voxel of the image captured by the first camera 102 and the corresponding pixel in the image captured by the second camera 104 determined by the pixel transformation module 218. In one example, the data matching cost may comprise a difference between RGB values of the corresponding pixels. In another example, the data matching cost may comprise a difference between feature values of the corresponding pixels.

At step 506, the depth estimation module 222 determines a depth map for the image captured by the first camera 102. In particular, for each pixel of the image captured by the first camera 102, the depth estimation module 222 selects the potential depth value having the lowest data matching cost as the estimated depth for the pixel. That is, for each potential depth value of each pixel of the image captured by the first camera 102, the depth estimation module 222 may estimate the actual depth value to be the depth value associated with the voxel that best matches the corresponding pixel in the image captured by the second camera 104.

It should now be understood that embodiments described herein are directed to a method and system for multi-camera cost volumes for self-supervised depth estimation. A plurality of cameras may capture images of a scene at a plurality of time steps. Each camera may have a different camera geometry and perspective view of the scene. A depth map for a first image captured by one of the cameras may be determined by determining a plurality of potential depth values for each pixel of the first image. As such, the first image may be described as a plurality of voxels, with each voxel having a potential depth value and 2D pixel coordinates.

For each voxel of the first image, a corresponding pixel may be determined for each of the images captured by the other cameras based on the potential depth value for the voxel and the relative camera geometry between the cameras. A data matching cost may then be determined between each voxel of the first image and the corresponding pixels of the other images. The data matching cost may comprise a difference in RGB values or a difference in feature values. If a plurality of other images are captured by a plurality of other cameras, an overall data matching cost may be determined for each voxel of the first image either by averaging the individual data matching costs for each of the other images for each pixel or taking the minimum data matching cost for all of the other images for each pixel. A depth map for the image may then be determined by estimating the depth for each pixel of the first image to be the potential depth value that has the lowest data matching cost.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving a first image of a scene captured by a first camera at a first time step and plurality of other images of the scene captured by a plurality of other cameras at a plurality of time steps;
determining a geometric relationship between the first camera at the first time step and each of the other cameras at each of the plurality of time steps;
defining a plurality of potential depth values for each pixel of the first image;
for each pixel and potential depth value of the first image, determining a corresponding pixel in each of the other images based on the geometric relationship between the first camera at the first time step and each of the other cameras at each of the plurality of time steps;
determining a data matching cost between each pixel and potential depth value of the first image and each corresponding pixel in each of the other images;
determining a cost volume for the first image captured by the first camera at the first time step based on the data matching costs; and
determining a depth map for the first image based on the cost volume, the depth map comprises a depth value of each pixel of the first image.

2. The method of claim 1, wherein the data matching cost associated with a pixel of the first image is based on a difference between an RGB value of the pixel and RGB values of the corresponding pixels in each of the other images.

3. The method of claim 1, wherein the data matching cost associated with a pixel of the first image is based on a difference between a feature value of the pixel and feature values of the corresponding pixels in each of the other images.

4. The method of claim 1, further comprising:
determining an overall data matching cost for each pixel and potential depth value of the first image based on the data matching cost between each pixel and potential depth value of the first image and each corresponding pixel in each of the other images; and
determining the cost volume based on the overall data matching cost.

5. The method of claim 4, wherein the overall data matching cost for each pixel and potential depth value of the first image comprises an average of the data matching cost for each corresponding pixel in the other images.

6. The method of claim 4, wherein the overall data matching cost for each pixel and potential depth value of the first image comprises a minimum of the data matching cost for each corresponding pixel in the other images.

7. A remote computing device comprising a controller programmed to:
receive a first image of a scene captured by a first camera at a first time step and a plurality of other images of the scene captured by a plurality of other cameras at a plurality of time steps;
determine a geometric relationship between the first camera at the first time step and each of the other cameras at each of the plurality of time steps;
define a plurality of potential depth values for each pixel of the first image;
for each pixel and potential depth value of the first image, determine a corresponding pixel in each of the other images based on the geometric relationship between the first camera at the first time step and each of the other cameras at each of the plurality of time steps;
determine a data matching cost between each pixel and potential depth value of the first image and each corresponding pixel in each of the other images;
determine a cost volume for the first image captured by the first camera at the first time step based on the data matching costs; and
determine a depth map for the first image based on the cost volume, the depth map comprises a depth value of each pixel of the first image.

8. The remote computing device of claim 7, wherein the data matching cost associated with a pixel of the first image is based on a difference between an RGB value of the pixel and RGB values of each of the corresponding pixels in each of the other images.

9. The remote computing device of claim 7, wherein the data matching cost associated with a pixel of the first image is based on a difference between a feature value of each pixel of the first image and feature values of each of the corresponding pixels in each of the other images.

10. The remote computing device of claim 7, wherein the controller is further programmed to:
determine an overall data matching cost for each pixel and potential depth value of the first image based on the data matching cost between each pixel and potential depth value of the first image and each corresponding pixel in each of the other images; and
determine the cost volume based on the overall data matching cost.

11. The remote computing device of claim 10, wherein the overall data matching cost for each pixel and potential depth value of the first image comprises an average of the data matching cost for each corresponding pixel in the other images.

12. The remote computing device of claim 10, wherein the overall data matching cost for each pixel and potential depth value of the first image comprises a minimum of the data matching cost for each corresponding pixel in the other images.

13. A system comprising:
a plurality of cameras; and
a remote computing device comprising a controller programmed to:
receive a first image of a scene captured by a first camera at a first time step and a plurality of other images of the scene captured by the plurality of cameras at a plurality of time steps;
determine a geometric relationship between the first camera at the first time step and each of the other cameras at each of the plurality of time steps;
define a plurality of potential depth values for each pixel of the first image;
for each pixel and potential depth value of the first image, determine a corresponding pixel in each of the other images based on the geometric relationship between the first camera at the first time step and each of the other cameras at each of the plurality of time steps;
determine a data matching cost between each pixel and potential depth value of the first image and each corresponding pixel in each of the other images;
determine a cost volume for the first image captured by the first camera at the first time step based on the data matching costs; and
determine a depth map for the first image based on the cost volume, the depth map comprises a depth value of each pixel of the first image.

14. The system of claim 13, wherein the data matching cost associated with a pixel of the first image is based on a difference between an RGB value of the pixel and RGB values of each of the corresponding pixels in each of the other images.

15. The system of claim 13, wherein the data matching cost associated with a pixel of the first image is based on a difference between a feature value of each pixel of the first image and feature values of each of the corresponding pixels in each of the other images.

16. The system of claim 13, wherein the controller is further programmed to:
   determine an overall data matching cost for each pixel and potential depth value of the first image comprising an average of the data matching cost for each corresponding pixel in the other images; and
   determine the cost volume based on the overall data matching cost.

17. The system of claim 13, wherein the controller is further programmed to:
   determine an overall data matching cost for each pixel and potential depth value of the first image comprising a minimum of the data matching cost for each corresponding pixel in the other images; and
   determine the cost volume based on the overall data matching cost.

* * * * *

UNITED STATES PATENT AND TRADEMARK OFFICE
CERTIFICATE OF CORRECTION

PATENT NO. : 12,159,423 B2
APPLICATION NO. : 17/696341
DATED : December 3, 2024
INVENTOR(S) : Vitor Guizilini and Jie Li Page 1 of 1

It is certified that error appears in the above-identified patent and that said Letters Patent is hereby corrected as shown below:

In the Specification

In Column 3, Line 29, delete "voxels" and insert --voxel--, therefor.
In Column 3, Line(s) 55, delete "moves" and insert --move--, therefor.
In Column 7, Line(s) 12, after "e.g", insert --.--.
In Column 7, Line(s) 13, after "depth values", delete "is" and insert --are--, therefor.
In Column 10, Line(s) 36, after "one", delete "of" and insert --or--, therefor.

Signed and Sealed this
Twenty-second Day of April, 2025

Coke Morgan Stewart
*Acting Director of the United States Patent and Trademark Office*